March 2, 1971     J. C. DUNAWAY     3,566,605
ROCKET NOZZLE POWER CONVERTER
Filed June 3, 1969     2 Sheets-Sheet 1
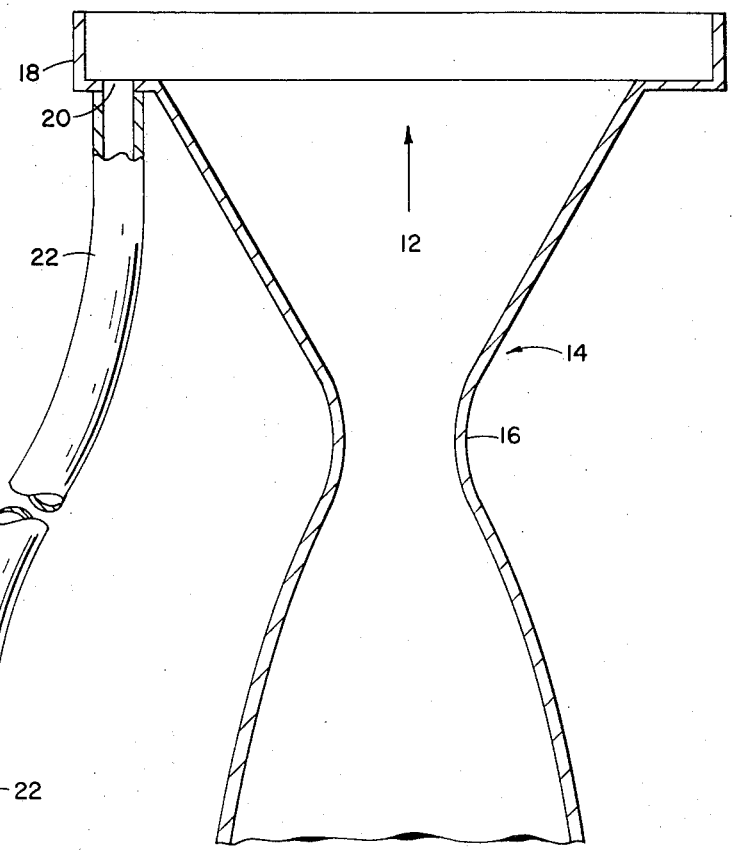
FIG. I
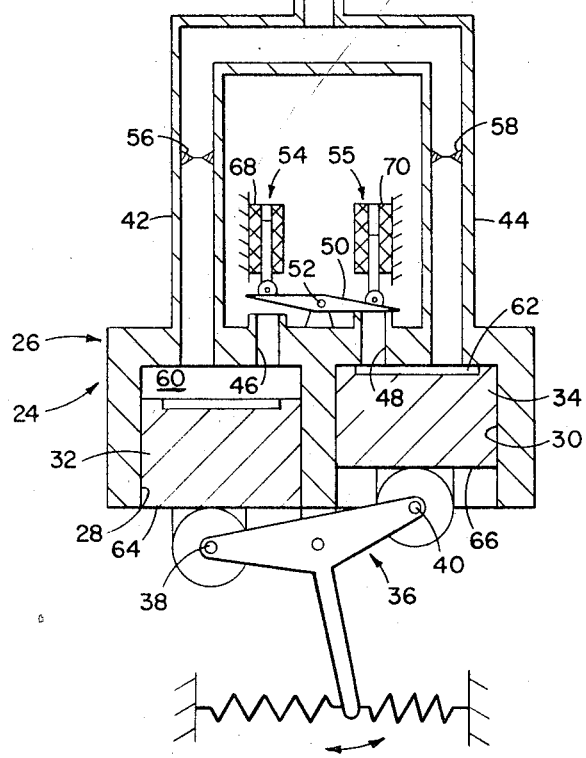
J. C. Dunaway,
INVENTOR
BY United States Patent Office 3,566,605
Patented Mar. 2, 1971

3,566,605
ROCKET NOZZLE POWER CONVERTER
J. C. Dunaway, Falkville, Ala., assignor to the United States of America as represented by the Secretary of the Army
Filed June 3, 1969, Ser. No. 830,070
Int. Cl. F02k 11/00
U.S. Cl. 60—200
10 Claims

ABSTRACT OF THE DISCLOSURE

Mechanism for converting the power from a rocket nozzle without a reduction in thrust. The rocket nozzle is provided with indentations or undercuts near its exit and as thrust producing gases flow by the undercuts to the atmosphere, air is entrained from a conduit means connected to the nozzle at the position of the indentations or undercutting. The conduit means connects to a bell crank mechanism or other force transmitting members. An upstream fixed orifice provided in the conduit and a downstream variable orifice provides a means for varying the pressure obtained from the rocket nozzle.

SUMMARY OF THE INVENTION

The device of the present invention includes a force transmitting member having a pair of pistons, each mounted in a cylinder and exposed to the atmosphere at the bottom of the cylinders. A bell crank is pivotally secured to the bottom of the pistons. The upper portions of the cylinders have a port communicating with the atmosphere and the interior of the cylinder. The upper portion of each cylinder is disposed in communication with the interior of a rocket nozzle adjacent the exit portion thereof by means of a tube. Each tube connecting into the cylinders have fixed orifices therein which are smaller than the ports of the cylinders. At the connection of the tube to the nozzle, a region of low pressure is created by entrainment of air by the supersonic nozzle. By using an upstream fixed orifice and a variable downstream orifice this low pressure can be varied and provide pressure differentials across the pistons to assist an actuating mechanism to move the pistons for displacement of the bell crank mechanism.

It is an object of the present invention, therefore, to provide apparatus for obtaining power from the nozzle of a rocket for performing useful work without "bleeding off" propelling gases and thereby reducing the thrusts of the rocket.

It is a further object of the present invention to provide apparatus in which air is entrained externally of the rocket nozzle, as a result of thrust producing gases flowing therethrough, whereby the entrainment of air is utilized for producing useful work.

These and other objects and advantages of the present invention will become more readily apparent from the following description and drawings.

BRIEF DESCRIPTION OF THE DRAWINGS

FIG. 1 is a schematic diagram of the principles of the present invention.

DESCRIPTION OF THE PREFERRED EMBODIMENT

Figure 2:
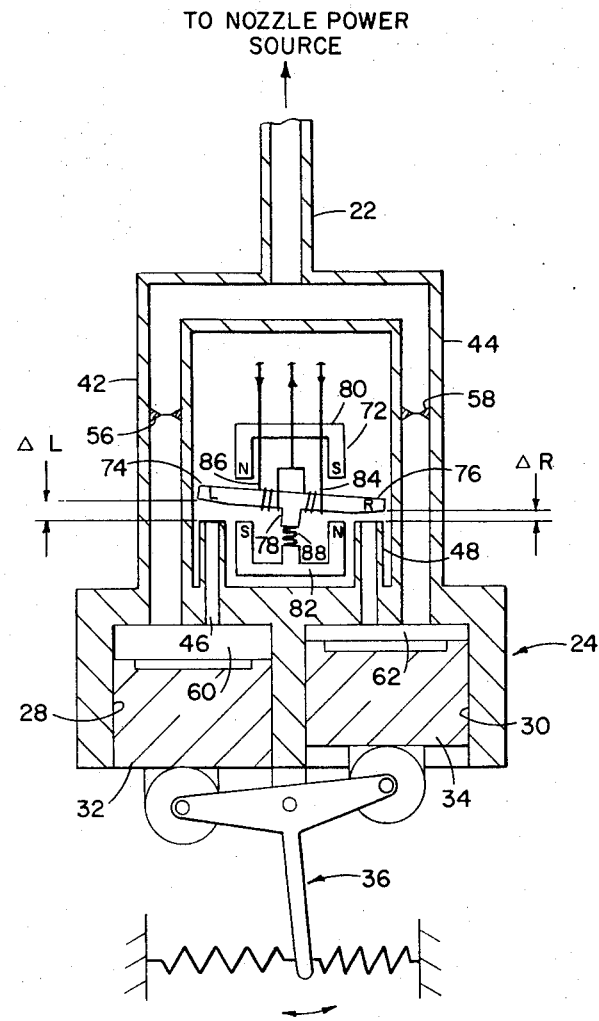
FIG. 2 is a view similar to FIG. 1 illustrating another mechanism for actuating the force transmitting members.

As shown in FIG. 1, a rocket propulsion chamber 12 is shown to include a nozzle 14 having a throat 16 and an exit portion 18. Adjacent exit portion 18 is an undercut or indented portion 20 having a pipe or conduit 22 communicating into the interior of the nozzle therethrough. By placing indentations or undercutting the nozzle near its exit, a region of low pressure is created in the conduit by entrainment of air by the supersonic nozzle. As shown in FIG. 1, a force transmitting device 24 includes a housing 26 having a pair of cylinders 28 and 30 enclosing a pair of pistons 32 and 34, respectively. A bell crank 36 is pivotally secured to the pistons at pivot connections 38 and 40. The cylinders of device 24 are connected in communication with pipe 22 by a pair of pipes 42 and 44.

Housing 26 includes a pair of ports 46 and 48 communicating into cylinders 28 and 30 and to the atmosphere. An arm 50 is pivotally secured to housing 26 as shown at 52, and a pair of solenoids 54 and 55 is operatively connected to arm 50 for movement thereof to selectively open and close ports 46 and 48. Pipes 42 and 44 are respectively provided with fixed orifices 56 and 58 upstream of the flow. Chambers 60 and 62 are formed between pipes 42 and 44 and the upper ends of pistons 32 and 34. The opposite ends 64 and 66 of pistons 32 and 34 are open to the atmosphere.

In operation, coil 68 of solenoid 54 may be energized for pivoting arm 50 in a direction which closes orifice 48 thus lowering the pressure in chamber 62 to substantially the same pressure as in pipe 22. Since the bottom surface 66 of piston 34 is exposed to atmospheric pressure, a pressure differential exists across piston 34 causing it to move upward to the position shown in FIG. 2. At the same time orifice 48 is closed, orifice 46 is opened and since orifice 46 is large compared to upstream orifice 56 in pipe 42, the pressure in chamber 60 approaches atmospheric pressure which causes piston 32 to be in a balanced condition. This means that the force on the bell crank 36 is due to the unbalanced force on piston 34. Application of a signal to coil 70 of solenoid 55 causes an unbalanced pressure to exist across piston 32 and displaces the bell crank in the opposite direction.

To provide proportional operation instead of bi-stable operation, a torque motor may be utilized instead of solenoids 68 and 70. The torque motor is provided with a displacement (α) proportional to differential current across the torque motor coils. The pressures in chambers 60 and 62 are proportional to the displacement angle (α). Mechanical feedback may be provided from the external force acting on the member being activated such as jet tabs or jet vanes, electrical feedback can be supplied by a potentiometer connected to the output bell crank. Such a proportional scheme is shown in FIG. 2 wherein like numerals refer to like parts. As shown in FIG. 2, solenoids 68 and 70 and pivotal member 50 are replaced by a torque motor 72. In this figure, body member 24 is shown to include cylinders 28 and 30, having pistons 32 and 34 respectively mounted therein. Conduits 42 and 44 are connected to combustion chamber 12 through conduit 22 as discussed supra, and bell crank 36 is pivotally secured to pistons 32 and 34 as discussed. In this embodiment, ports 46 and 48 extend upward from chambers 60 and 62, respectively of cylinders 32 and 30, to terminate adjacent the ends 74 and 76 of a pivotally mounted lever 78. Lever 78 is mounted between a pair of magnets 80 and 82. A pair of coils 84 and 86 are connected to a source of electrical energy for actuation of lever 78 in the manner described hereinbelow.

Lever 78 is spring loaded by a flexure member 88, in its center position so that when no current is allowed to flow, ΔR and ΔL are equal. ΔR and ΔL are the distances between the ends of lever 78 and the tops of ports 46 and 48. The bleed areas out of chamber 60 and 62 are equal therefore the pressure in chambers are equal resulting in no torque being applied to bell crank 36.

When the current into the coil is polarized so that the end 76 of the pivotal lever is the south pole of a magnet the pivotal lever is deflected toward the north pole faces of the torque motor and away from the south pole pieces. This tends to make ΔR smaller than ΔL which in turn makes the vacuum in chamber 62 greater than the vacuum in chamber 60. This difference in force on pistons 32 and 34 causes the bell crank to take an angular displacement.

The gap ΔR and ΔL between pivotal lever 70 and ports 46 and 48 is proportional to the current that passed through the coil. Also the vacuum chambers 60 and 62 are proportional to ΔR and ΔL. And the angular displacement of the bell crank is proportional to the vacuum in chambers 60 and 62.

I claim:

1. Apparatus for converting power provided by ejection of thrust producing gases through the nozzle of a rocket engine, into useful work without reducing the thrust of the rocket engine comprising:
   (a) a force transmitting device for applying a force for producing work;
   (b) conduit means having a first end connected to said force transmitting device and having a second end communicating into said nozzle at a predetermined position therein, said predetermined position defining a region of low pressure in said nozzle, whereby air is entrained from said conduit means responsive to the expulsion of said thrust producing gases from said nozzle to provide a region of low pressure in said conduit means and said force transmitting device; and,
   (c) means for providing pressure differentials in said force transmitting device in response to said entrainment of air through said conduit, whereby a work function may be performed due to said pressure differentials, said means including variable orifice means carried adjacent said second end of said conduit and fixed orifice means disposed in said conduit means intermediate said first end thereof and said variable orifice means.

2. Apparatus as in claim 1 wherein said nozzle is provided with an undercut portion adjacent the exit thereof and said conduit communicating into the interior of said nozzle at said undercut portion.

3. Apparatus as in claim 2 wherein said conduit means includes:
   (a) a first conduit connected to said undercut portion of said nozzle;
   (b) second and third conduits connected to said first conduit and to said force transmitting device;
   (c) said fixed orifice means being disposed in said second and third conduits.

4. Apparatus as in claim 3 wherein said force transmitting device includes a housing having variable volume means therein disposed for displacement responsive to said pressure differentials, and a force transmitting member connected to said variable volume means for movement thereby responsive to displacement of said variable volume means.

5. Apparatus as in claim 4 wherein said variable volume means are a pair of pistons mounted in a pair of cylinders disposed in said housing.

6. Apparatus as in claim 5 wherein said variable orifice means is a pair of ports disposed in said housing each port disposed in communication with said cylinders, and actuating means for selectively opening and closing said ports for creating said pressure differentials.

7. Apparatus as in claim 6 wherein said actuating means are solenoid valves disposed for activation to selectively open and close said ports.

8. Apparatus as in claim 7 wherein said ports are mounted in said housing in communication with the interior thereof at the tops of said pistons, each of said pistons being exposed to the atmosphere at the bottom portion of said cylinders.

9. Apparatus as in claim 8 wherein said force transmitting member is a bell crank secured to said pistons for movement thereby.

10. Apparatus as in claim 6 wherein said actuating means is a torque motor having a pivoted lever disposed therein, said torque motor disposed for activation to pivot said lever, whereby said lever selectively opens and closes said ports to the atmosphere.

References Cited

UNITED STATES PATENTS

| | | | |
|---|---|---|---|
| 2,284,509 | 5/1942 | Boes et al. | 60—60 |
| 2,412,206 | 12/1946 | Crane | 60—60 |
| 2,433,443 | 12/1947 | Edge | 60—60 |
| 2,610,464 | 9/1952 | Knoll | 60—264X |
| 3,272,077 | 9/1966 | Meulendyke et al. | 91—3 |

DOUGLAS HART, Primary Examiner

U.S. Cl. X.R.

60—39.18, 60; 91—3